March 11, 1958     R. W. WILSON     2,826,134
COULTER MOUNTING
Filed Aug. 9, 1955
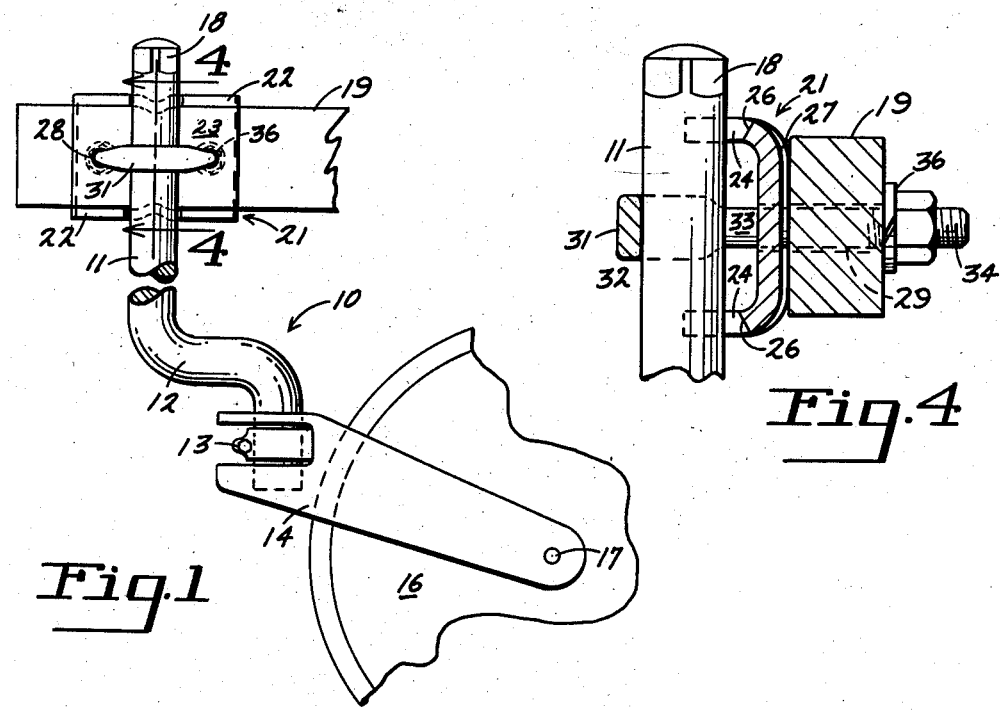
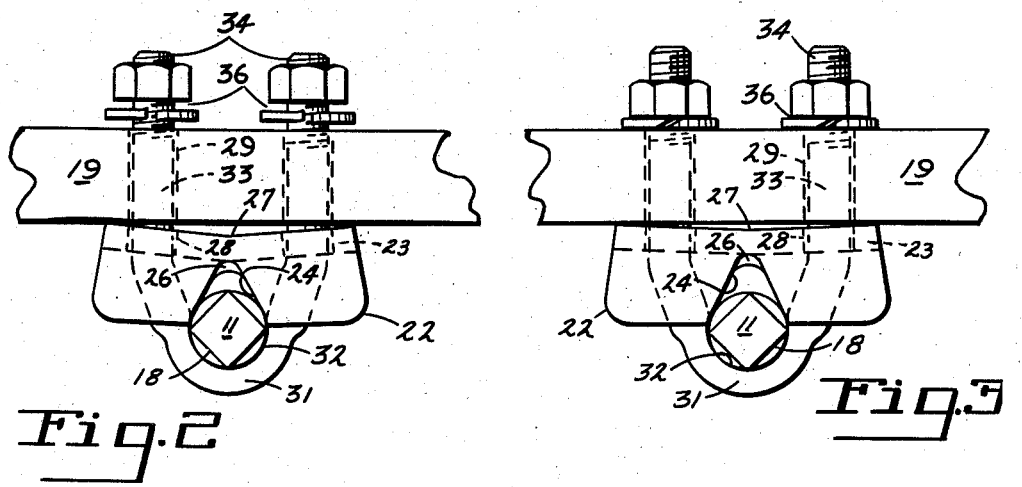
INVENTOR.
RAYMOND W. WILSON.
BY E. C. McRae.
J. R. Faulkner.
T. H. Oster.
ATTY's.

United States Patent Office 2,826,134
Patented Mar. 11, 1958

2,826,134

COULTER MOUNTING

Raymond W. Wilson, Ferndale, Mich., assignor to Ford Motor Company, Dearborn, Mich., a corporation of Delaware Application August 9, 1955, Serial No. 527,302

3 Claims. (Cl. 97—198.1)

As is apparent to those skilled in the art, the rolling coulter is used with a plow to cut or slice the trash ahead of the plow bottoms so that such trash may be readily covered by the overturned furrow slice. At the same time, the coulter defines the furrow wall which makes it easier for the plow botom to turn the furrow slice and aids appreciably in reducing the tractor draft. In crumbling soils it is difficult to obtain a smooth, firm, furrow wall and it then becomes necessary to adjust the coulter laterally away from the plow to overcome this condition.

The position of the coulter relative to the plow bottom is also important as it has a bearing on the penetration of the plow. For example, in hard ground the coulter should be elevated with respect to the plow share. In trashy, soft ground, the coulter should be lowered so that it is close to the bottom line of the plow share to more readily sever trash. It is, therefore, quite apparent that the correct positioning of the coulter is necessary for effective plowing.

In addition to these desirable ends, it is important that the support of the coulter be easily adjusted yet positively lock the coulter shank in the desired position of adjustment. As obstructions in the soil are constantly being encountered, it will be appreciated that the problem of providing a coulter support to conveniently permit such adjustments, yet resists the shocks transmitted to it without dislodging or loosening or even losing the coulter, is a difficult one to solve.

Heretofore many and varied clamping devices have been used in the art. A number of devices use multiple clamping members while others incorporate elaborate modifications to the coulter shank in the way of annular and longitudinal grooves.

It is, therefore, an object of this invention to provide an improved rolling coulter support for a moldboard plow which provides an easy and convenient method of positioning the coulter relative to the plow base to suit varying ground conditions.

Another object is to provide an improved rolling coulter mounting which provides an easy and convenient method of adjusting the coulter shank and which will positively hold its adjustment.

A further object of this invention is to provide a simply constructed positively locked rolling coulter mounting.

Other objects and advantages of this invention will be made more apparent as this description proceeds, particularly when considered in connection with the accompanying drawings, wherein:

Figure 1 is a side elevational view partly in section of the improved coulter mounting holding the coulter shank to the plow beam.

Figure 2 is an enlarged top view partly in section of the coulter mounted to the beam prior to the tightening of the clamp.

Figure 3 is an enlarged top view partly in section of the coulter mounted to the beam after the clamp has been tightened.

Figure 4 is a cross sectional view taken along the plane 4—4 of Figure 1.

A rolling coulter generally indicated at 10 has a depending shank 11 having a crank portion 12 at its lower end. Rotatably supported on said crank portion by conventional clamping means 13 is a fork 14. A coulter disc 16 is rotatably secured in the other end of the fork 14 by bolt means 17. Except for a four-sided flat 18 provided on its upper end for aid in laterally positioning the coulter disc with respect to the plow bottom, the depending shank 11 is devoid of any indentations or longitudinal and/or annular grooves.

The plow on which the novel coulter mounting may be secured may be made of any one of the numerous designs available in the art. A detail description of it, consequently, is unnecessary as it forms no part of this invention except to illustrate an application of the novel mounting means. Therefore, only the beam 19 of a typical plow is shown on the drawings.

A coulter seat 21 of novel construction is provided adjacent one side of the plow beam 19. It is a substantially U-shaped member having upper and lower legs 22 extending transversely of the plow beam 19 and having a closed boxlike back 23 adjacent one side of the beam. The legs 22 which are parallel to each other in a horizontal plane, are provided with vertically aligned entrant notches 24 for receival of the coulter shank 11. The notch 24 is generally triangular in appearance and has its apex 26 inwardly of the legs 22 and near the back 23. The immediate entrant area is rounded somewhat to conform to the configuration of the shank 11. This permits the easy and simple abutting of the shank 11 with a substantial portion of the entrant notch 24.

Viewing the seat 21 as shown in Figures 2 and 3, the back 23 is bent inwardly and away from the beam 19 on a vertical axis at a medial point of the seat 21 forming a V 27. In the manufacture of the seats it has been found to be expedient to stamp out the notch opening 24, a size smaller than the diameter of the shank 11, before making this bend, hence after the bend the notches are widened beyond their initial opening and receive approximately one-half of the shank 11. The triangular configuration of notch 24 has a two-fold purpose which will be explained later. A pair of generally horizontal and elongated holes 28 are provided on a horizontal plane, one on each side of the vertical axis of the V 27. In actual practice, the holes 28 like the notches 24 are provided in the blank before the bending and forming operations. After the bending and forming has been completed, the holes 28 are substantially aligned with similar holes 29 in the beam 19.

A generally U-shaped clamp 31, having a band-like flat inner face 32, is provided with legs 33 threaded as shown at 34. The legs 33 extend through the holes 28 and 29 on each side of the shank 11 bringing the face 32 in contact with a substantial portion of the peripheral surface of shank 11. Conventional locking means 36 are used to secure the clamp 31 to the beam 19.

In the assembly of this novel construction, the seat back 23 is placed against the beam 19 so that holes 28 in the seat 21 are substantially aligned with holes 29 in the beam 19. The coulter shank 11 is vertically aligned in the entrant notches 24 and the legs 33 of the clamp 31 are inserted through the aligned holes 28 and 29 in the seat and plow beam respectively. Conventional means 36 are tightened so that the inner face 32 of the clamp is drawn tight against the shank 11 and the shank 11 is drawn tight in the notches 24. When the clamp 31 is tightened, the coulter shank 11 is forced toward the clamp 21 and the beam 19. This force is resisted by the contact of the back 23 to the beam 19 at its extreme ends. This tends to flatten clamp 21 at its V 27 with respect to the beam 19 thus closing the notch 24 around a substantial portion of the coulter shank 11. The generally triangulated notch 24 permits this predetermined amount of the shank 11 to be received therein. Thus, the shank 11 is clamped between two entrant notches 24 and the U-shaped clamp 31 and thus secures the coulter in a highly efficient manner. A certain amount of resiliency is present in this design in view of the fact that the V is never completely removed upon the tightening of the clamp 31 in view of the configuration of the triangulated notches 24 being generally the same as that of the coulter shank 11, a large area of contact between the shank 11 and the entrant notches 24 is provided.

Because the holes 28 are provided in the blank prior to the forming of the seat 21, their respective vertical axes move easily from each other upon tightening of the clamp 31. Their generally elongated or elliptical shape in a horizontal plane precludes a rocking or twisting of the coulter support 21 with respect to the beam 19.

From the foregoing description it is thus apparent that there is here provided an improved coulter mounting which permits secure mounting of the coulter to the plow beam without excessive cost in the manufacture of either the coulter clamping means or the coulter shank. The adjustment of the coulter to any desired selected vertical or rotational position can be positively made within a few seconds.

It will be understood that the invention is not to be limited to the exact construction shown and described, but that various changes and modifications may be made without departing from the spirit and the scope of the invention as defined in the appended claims.

What is claimed is:

1. An adjustable coulter mounting for a moldboard plow having a longitudinally forwardly extending beam, said mounting comprising: a longitudinally extending channel-shaped coulter shank seat, the back of the channel abutting the plow beam and the legs of the channel extending in generally parallel planes from the beam, each leg having an outwardly diverging, generally V-shaped notch formed in its free outer edge and extending substantially the entire width of the leg, the notches in the legs registering and being located generally medially of the length of the legs, the seat being longitudinally arched in a direction to bias the notched medial portion of the seat away from the plow beam, whereby only the longitudinal extremities of the seat engage against the beam, a cylindrical, vertically extending coulter shank at least partially received within the notches, and a U bolt extending about the coulter shank and having its legs extending through the back of the channel-shaped seat and the beam and clamping the coulter shank against the notched portion of the seat to more or less draw the notched medial portion of the seat against the beam, converge the walls of the notches somewhat, and cam said walls into tighter engagement with the coulter shank.

2. A coulter mounting as claimed in claim 1, in which the outer portions of the V-shaped notches in the seat are formed of an arcuate contour generally conforming to the curvature of the coulter shank.

3. An adjustable coulter mounting for a moldboard plow having a longitudinally forwardly extending beam, said mounting comprising: a longitudinally extending channel-shaped coulter shank seat, the back of the channel abutting the plow beam and the legs of the channel extending in generally parallel horizontal planes from the beam, each leg having an outwardlly diverging, generally V-shaped notch formed in its free outer edge and extending substantially the entire width of the leg, the notches in the legs registering and being located generally medially of the length of the legs, the seat being longitudinally arched in a direction to bias the notched medial portion of the seat away from the plow beam, whereby only the longitudinal extremities of the seat engage against the beam, a cylindrical, vertically extending coulter shank at least partially received within the notches, and a clamping means having a portion thereof extending through the back of the channel-shaped seat and the beam and clamping the coulter shank against the notched portion of the seat to more or less draw the notched medial portion of the seat against the beam, converge the walls of the notches somewhat, and cam said walls into tighter engagement with the coulter shank.

References Cited in the file of this patent

UNITED STATES PATENTS

| | | |
|---|---|---|
| 789,399 | Westervelt | May 9, 1905 |
| 917,762 | Hench | Apr. 13, 1909 |
| 2,655,088 | Charley | Oct. 13, 1953 |